US011455793B2

(12) United States Patent
Campos Macias et al.

(10) Patent No.: US 11,455,793 B2
(45) Date of Patent: Sep. 27, 2022

(54) ROBUST OBJECT DETECTION AND CLASSIFICATION USING STATIC-BASED CAMERAS AND EVENTS-BASED CAMERAS

(71) Applicant: Intel Corporation, Santa Clara, CA (US)

(72) Inventors: Leobardo Campos Macias, Guadalajara (MX); Rafael De La Guardia Gonzalez, Guadalajara (MX); David Gomez Gutierrez, Tlaquepaque (MX); Anthony Kyung Guzman Leguel, Guadalajara (MX); Jose Ignacio Parra Vilchis, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 16/829,203

(22) Filed: Mar. 25, 2020

(65) Prior Publication Data
US 2020/0226377 A1    Jul. 16, 2020

(51) Int. Cl.
*G06V 20/10*    (2022.01)
*G06K 9/62*    (2022.01)

(52) U.S. Cl.
CPC ........... *G06V 20/10* (2022.01); *G06K 9/6256* (2013.01); *G06K 9/6267* (2013.01)

(58) Field of Classification Search
CPC ............ G06K 9/00664; G06K 9/6256; G06K 9/6267; G06V 20/10
USPC ........................................................ 382/103
See application file for complete search history.

(56) References Cited

U.S. PATENT DOCUMENTS

| 2012/0140072 A1* | 6/2012 | Murashita | .......... G06K 9/00805 348/148 |
| 2016/0034771 A1* | 2/2016 | Schamp | ............... B60G 17/019 348/148 |

OTHER PUBLICATIONS

Pini ("Learn to See by Events: Color Frame Synthesis from Event and RGB Cameras", arXiv 2019 ) (Year: 2019).*

(Continued)

*Primary Examiner* — Mark Roz
(74) *Attorney, Agent, or Firm* — Banner & Witcoff Ltd.

(57) ABSTRACT

Techniques are disclosed to facilitate, in autonomous vehicles, the robust detection and classification of objects in a scene using a static sensors in conjunction with event-based sensors. A trained system architecture may be implemented, and the fusion of both sensors thus allows for the consideration of scenes with overexposure, scenes with underexposure, as well as scenes in which there is no movement. In doing so, the autonomous vehicle may detect and classify objects in conditions in which each sensor, if operating separately, would not otherwise be able to classify (or classify with high uncertainty) due to the sensing environment.

21 Claims, 9 Drawing Sheets

(56) References Cited

OTHER PUBLICATIONS

Rebecq et al., Events-to-Video: Bringing Modern Computer Vision to Event Cameras—IEEE Conference on Computer Vision and Pattern Recognition (CVPR), 2019, 23 pp.
A.R. Vidal et al., "Hybrid, Frame and Event based Visual Inertial Odometry for Robust, Autonomous Navigation of Quadrotors", Computer Science, Published in ArXiv 2017, 8 pp.
H. Liu et al, "Combined frame- and event-based detection and tracking", 2016 IEEE, pp. 2511-2514.
A. Sironi et al. "HATS: Histograms of Averaged Time Surfaces for Robust Event-based Object Classification", Mar. 21, 2018, 10 pp.
S. Pini et al., "Learn to See by Events: Color Frame Synthesis from Event and RGB Cameras", Dec. 10, 2019, 19 pp.
G. Gallego et al., "Event-based Vision: A Survey", Apr. 17, 2019, 25 pp.

* cited by examiner

ROBUST OBJECT DETECTION AND CLASSIFICATION USING STATIC-BASED CAMERAS AND EVENTS-BASED CAMERAS

TECHNICAL FIELD

Aspects described herein generally relate to autonomous vehicles (AV) and, more particularly, to techniques implementing different types of camera sensor input data to improve upon existing object detection and classification systems used by autonomous vehicles.

BACKGROUND

The perception system of an AV needs to be reliable under different lighting and environmental conditions. And although radar systems can be used to detect other vehicles, the detection and classification of other road users, such as pedestrians, cyclists, stationary objects, etc., relies mainly on vision whose confidence may drop during nighttime or when visibility is decreased, such as while driving through low-light tunnels or in rain, fog, snow, etc. Object recognition with conventional cameras also suffers from low dynamic range, high latency, and motion blur often encountered in images from these sensors. Therefore, current AV object detection systems have several drawbacks and have been shown to be inadequate in several respects.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

In the drawings, like reference characters generally refer to the same parts throughout the different views. The drawings are not necessarily to scale, emphasis instead generally being placed upon illustrating the principles of the disclosure. In the following description, various embodiments of the disclosure are described with reference to the following drawings, in which.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
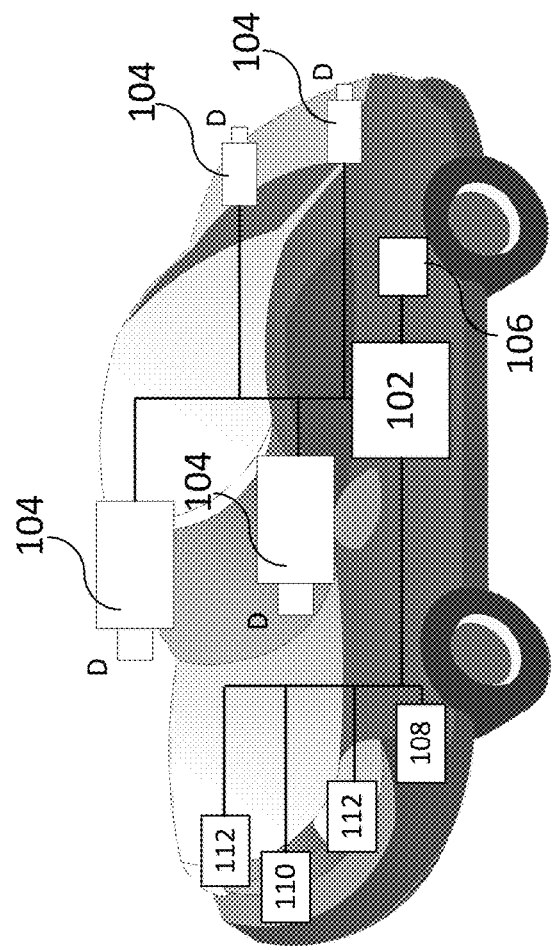
FIG. 1 illustrates an exemplary autonomous vehicle in accordance with various aspects of the present disclosure.

The following detailed description refers to the accompanying drawings that show, by way of illustration, exemplary details in which the aspects of the disclosure may be practiced. In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As noted above, current AV object detection systems have various drawbacks. In recent years, interest in event-based classification has grown because it promises to potentially address some of the current issues in AV object detection systems. However, current techniques that use classification with an event-based camera, as well as techniques implementing the reconstruction of video and image synthetization fail in static views, as there are no events detected by the event camera. Therefore, to address these and other shortcomings of conventional AV object detection and classification, the aspects as described herein implement a deep learning method for object detection and classification, which combines inputs from both static-based cameras and event-based cameras into several frame channel inputs to provide enhanced detection and classification of road users. As further discussed below, this provides robust detection in a variety of conditions that could not be handled by either of the two sensors in isolation, such as extreme conditions in illumination and relative motion.

Further, the aspects as described herein enable the robust detection and classification of objects in a scene using a static-based sensor in conjunction with an event-based sensor. The aspects as described herein utilize a configuration and design of a convolutional deep neural network architecture. The fusion of both sensors thus allows for the consideration of scenes with overexposure (i.e. situations in which the sun strikes the static sensor directly), scenes with underexposure (i.e. situations in which there is a significant lack of light), as well as scenes in which there is no movement. In other words, the aspects as described herein allow for the detection and classification of objects in conditions in which each sensor, if operated separately, may not otherwise classify (or classify with high uncertainty) mainly because of sensing conditions.

Various aspects are described throughout the disclosure with reference to autonomous vehicles by way of example and not limitation. For instance, although the aspects described herein may advantageously be used as part of an AV architecture, the aspects may be implemented as part of any suitable type of fully autonomous vehicle, semi-autonomous vehicle, or non-autonomous vehicle.

FIG. 1 shows a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed above, the Figures are not to scale) and are provided by way of example and not limitation. The safety system 200 may include various components depending on the requirements of a particular implementation.

Figure 2:
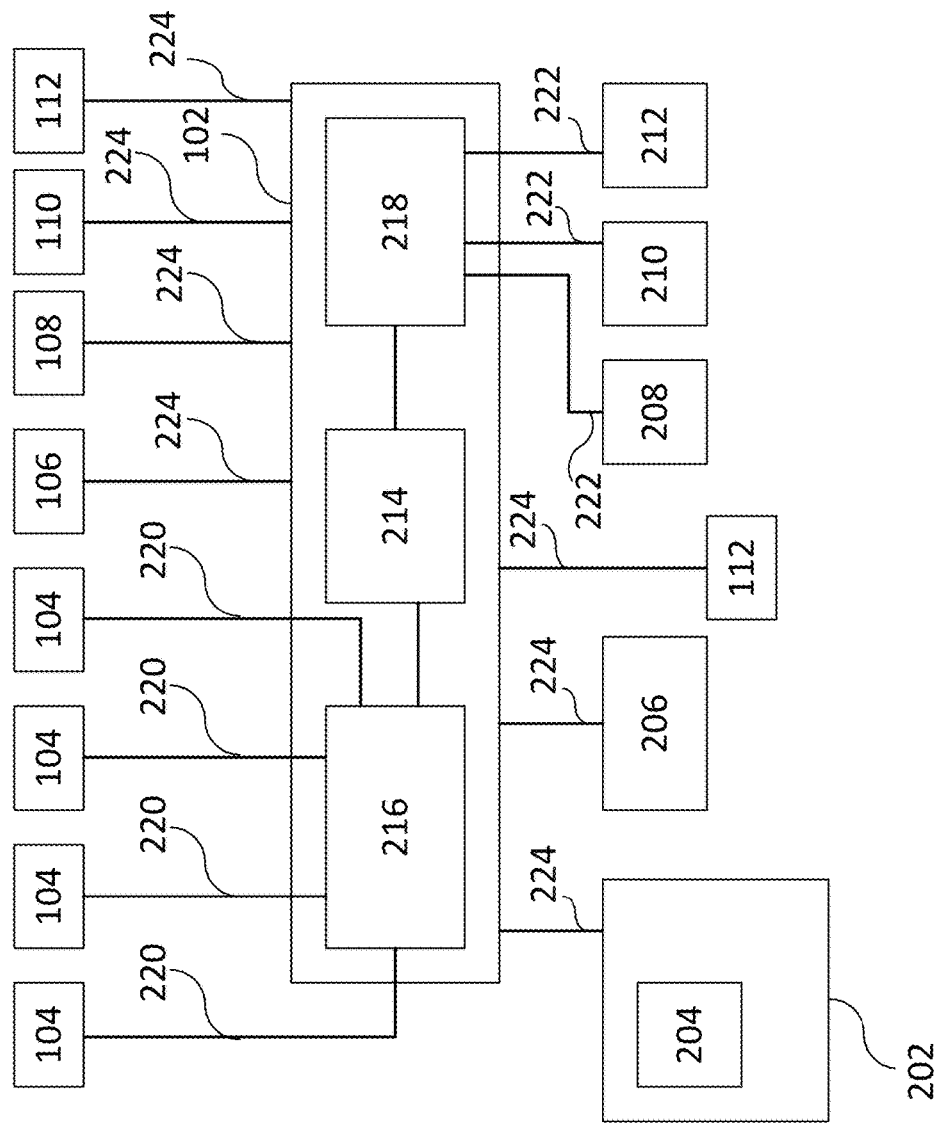
FIG. 2 illustrates various exemplary electronic components of a safety system of the exemplary autonomous vehicle of FIG. 1 in accordance with various aspects of the present disclosure.

As shown in FIG. 1 and FIG. 2, the safety system 200 may include one or more processors 102, one or more image acquisition devices 104 such as, e.g., one or more cameras, one or more position sensors 106 such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212.

The wireless transceivers 208, 210, 212 may be configured according to different desired radio communication protocols or standards. By way of example, a wireless transceiver (e.g., a first wireless transceiver 208) may be configured in accordance with a Short Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards. As a further example, a wireless transceiver (e.g., a third wireless transceiver 212) may be configured in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more wireless transceivers 208, 210, 212 may be configured to transmit signals via an antenna system (not shown) via an air interface.

The one or more processors 102 may include an application processor 214, an image processor 216, a communication processor 218, or any other suitable processing device. Similarly, image acquisition devices 104 may include any number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218.

The memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Such transmissions may also include communications (one-way or two-way) between the vehicle 100 and one or more other (target) vehicles in an environment of the vehicle 100. For example, these communications may facilitate coordination of navigation of the vehicle 100 in view of or together with other (target) vehicles in the environment of the vehicle 100. As another example, such communication may include broadcast transmissions to unspecified recipients in a vicinity of the transmitting vehicle 100.

One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable protocols.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for data processing (e.g. image, audio, etc.) and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases, image processing software, etc., as well as a trained system, such as a neural network, a deep neural network, and/or a convolutional deep neural network (CNN), for example, as further discussed herein. The one or more memories 202 may include any number of random access memories, read only memories, flash memories, disk drives, optical storage, tape storage, removable storage, and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

The one or more memories 202 may store data, e.g., in a database or in any different format, that, e.g., indicates a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location and/or orientation of the vehicle 100 relative to the known landmarks and refine the determination of the vehicle's location. Certain aspects of this technology may be included in a localization technology such as a mapping and routing model.

The map database 204 may include any suitable type of database storing (digital) map data for the vehicle 100, e.g., for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the safety system 200 may include a driving model, which may also be referred to as a "safety driving model" or "driving policy model," and which may be implemented e.g. in an advanced driving assistance system (ADAS) and/or a driving assistance and automated driving system. By way of example, the safety system 200 may include (e.g., as part of the driving model) a computer implementation of a formal model such as a safety driving model. A safety driving model may be an implementation of a mathematical model formalizing an interpretation of applicable laws, standards, policies, etc. that are applicable to self-driving (e.g. ground) vehicles. An implementation in a host vehicle of a safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be an implementation of a mathematical model for safety assurance that enables identification and performance of proper responses to dangerous situations such that self-perpetrated accidents can be avoided.

A safety driving model may implement logic to apply driving behavior rules such as the following five rules:
  Do not hit someone from behind.
  Do not cut-in recklessly.
  Right-of-way is given, not taken.
  Be careful of areas with limited visibility.
  If you can avoid an accident without causing another one, you must do it.

It is to be noted that these rules are not limiting and not exclusive, and can be amended in various aspects as desired. The rules rather represent a social driving contract that might be different depending on the region, and may also develop over time. While these five rules are currently applicable in most of the countries, they might not be complete and may be amended.

As described above, the vehicle 100 may include the safety system 200 as also described with reference to FIG. 2. The vehicle 100 may include the one or more processors 102 e.g. integrated with or separate from an engine control unit (ECU) of the vehicle 100. The safety system 200 may in general generate data to control or assist to control the ECU and/or other components of the vehicle 100 to directly or indirectly control the driving of the vehicle 100.

As further discussed herein, autonomous vehicles (AVs) utilize object detection systems as a type of machine vision, which allows an AV to detect and identify objects in a road scene. The AV may then use this information for various automated driving and/or navigation tasks, which may depend upon the location and type of object that is detected. For instance, the sensed data (and in some instances, map data) may be used to build an environmental model, and the environmental model may then be used by to construct a "state" that is used by the driving policy to determine an "action" that is to be carried out by the host vehicle. Therefore, it is preferable, and often necessary, for an AV to accurately and reliably identify the location of objects within a particular field of view corresponding to a specific road scene as well as what type of object has been detected. For instance, the road scene may correspond to the front view similar to what would be experienced by a driver driving the vehicle, or any other suitable field of view around the vehicle for which the detection of object locations and types may be useful for AV driving and/or navigation.

The Functionality and Operation of Event Cameras and Static Cameras

The detection of objects within a road scene may be performed using sensor data, such as radar and LIDAR for example. However, the aspects described herein are directed to the use of image-based sensor data to provide object detection and classification, such as image-based sensor data generated via one of more of the image acquisition devices 104 as discussed above with respect to the safety system 200. Thus, in an aspect, the image acquisition devices 104 may include one or more image cameras that operate in a dynamic nature, such as event cameras, as well as one or more other cameras that operate in more of a "static" nature (e.g. cyan (C), magenta (M), yellow) cameras, red (R), green (G), blue (B) cameras, etc.). As used herein, the term "static" may refer to any suitable type of camera that captures image data for a set of pixels in a single frame, and which may capture image data for each successive frame in accordance with a defined frame rate. Thus, in contrast to the dynamic operation of event cameras, for example, in which each pixel reports an individual change in brightness over time, a camera operating in a static manner provides an image that includes the state of each pixel at one particular time instant.

Event cameras utilize imaging sensors that detect local changes in brightness, and are particularly useful for machine vision applications as they advantageously have a temporal resolution on the order or microseconds, a high dynamic range (e.g., 120 dB or greater), and do not suffer under/overexposure or motion blur. To do so, each pixel inside the event camera typically operates independently and asynchronously with the other pixels. In other words, each pixel generates sensor data that indicates changes in brightness as they occur, and otherwise remains silent (e.g., by not outputting sensor data or outputting sensor data that does not indicate an event). Thus, each pixel of an event camera reports a series of timewise events that, when sensed or otherwise indicated in the sensor data output by the event camera, indicates a deviation of a level of brightness detected at that pixel from a nominal value at a particular time.

In various aspects, the one or more event cameras may be implemented as any suitable type of imaging sensor that responds to local changes in brightness, which may have any suitable pixel resolution and temporal resolution to generate sensor data indicative of events detected via each pixel associated with a road scene at various time instants over a period of time. For example, the event camera may be implemented as a temporal contrast sensor, which produces events that indicate polarity (increase or decrease in brightness), a temporal image sensor that indicates the instantaneous intensity with each event, etc. To provide additional examples, the event camera may be implemented as a (Dynamic and Active-pixel Vision Sensor) (DAVIS) camera that contains a global shutter active pixel sensor (APS) in addition to the dynamic vision sensor (DVS) that shares the same photosensor array, thus enabling the DAVIS camera to produce image frames alongside detected events.

Static cameras, on the other hand, have a lower dynamic range compared to event cameras and are more static in nature, acquiring images by outputting sensor data in a synchronous manner in accordance with the static camera's frame rate, which is typically between 6 and 60 frames-per-second (fps) for standard static cameras and up to several thousand fps for more specialized high frame rate static cameras. In various aspects, the one or more static cameras may be implemented as any suitable type of imaging sensor that generates static image data corresponding to each frame within a successive series of frames in accordance with a frame rate that is controlled by or otherwise known by the safety system 200 of the vehicle in which the aspects as discussed herein are implemented. For instance, the aspects as described herein are not limited to a specific type of static camera or those operating within a particular range of wavelengths in this regard, and may include modified static cameras (e.g., those configured to also detect near-infrared wavelengths), depth cameras that are based on static imaging, 3D cameras that are based on static imaging, etc. As further discussed below with reference to FIG. 3, the training procedure for the neural network system may be adapted in accordance with the specific type of dynamic (e.g., event) and static (e.g. CYM, RGB, etc.) cameras that are used for a particular application.

Figure 3:
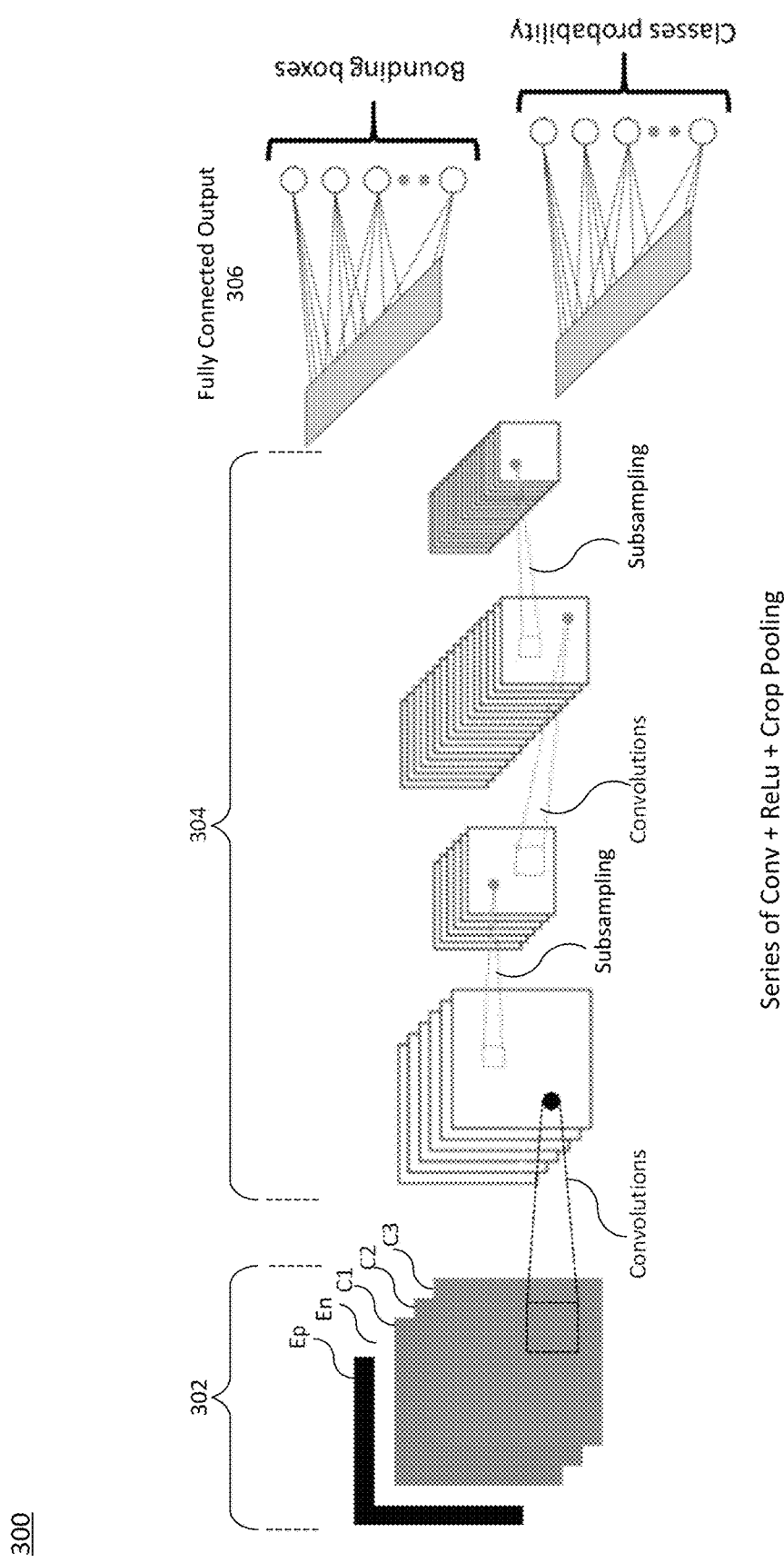
FIG. 3 illustrates an exemplary convolutional neural network architecture in accordance with various aspects of the present disclosure.

A Neural Network Architecture using Event Camera Sensor Data and Static Camera Sensor Data FIG. 3 illustrates an exemplary convolutional neural network architecture in accordance with various aspects of the present disclosure. The convolutional neural network (CNN) architecture 300 as shown in FIG. 3 is by way of example and not limitation, and may include additional, less, or alternate layers as those shown and described with reference to FIG. 3. Moreover, the aspects are described herein in conjunction with the use of a CNN, although this is also by way of example and not limitation. The aspects described herein may be implemented in accordance with any suitable type of trained system (e.g., a machine learning algorithm, the CNN as described herein (which is as trained system that implements a neural network architecture), any suitable type of object classifier system, etc.) that is trained or otherwise configured to detect, locate, and classify objects within an AV road scene.

Moreover, aspects include the trained system, regardless implementation, being configured to utilize a combination of both event camera images and other static camera image types, such as CYM or RGB camera images, for instance. Thus, aspects include the CNN as shown in FIG. 3 (or other suitable trained system) being implemented as hardware (e.g., the one or more processors 102), software (instructions stored in the memories 202), or a combination thereof. For example, the CNN as shown in FIG. 3 (or other suitable trained system) may be implemented via the one or more memories 202 storing software, executable instructions, logic, code, etc., that, when executed by the one or more processors 102 (or an ECU associated with or forming part of the one or more processors 102), controls or otherwise facilitates the aspects as described herein with respect to, for example, object classification and detection via the use of event camera images and static camera images.

As shown in FIG. 3, the CNN architecture 300 includes an input layer 302, hidden layers 304, and an output layer 306. The input layer 302 provides, as input to the CNN architecture 300, images associated with several respective frame channels. The images input via each respective frame channel (e.g. Ep, En, C1, C2, and C3) represent sensor data associated with the image acquisition devices 104 of the vehicle safety system 200 capturing a road scene. The hidden layers 304 analyze the images in accordance with any suitable trained neural network algorithm. The CNN architecture 300 also includes a fully connected output layer 306 that outputs the location (bounding boxes) and type (class probability) of objects within the road scene as identified by the trained hidden layers 304. The CNN architecture 300 as shown in FIG. 3 includes 5 frame channels (two event camera frame channels and three static camera frame channels), although aspects include the CNN architecture 300 receiving images via any suitable number of frame channels depending upon the implementation of the cameras used by a particular AV and the processing capabilities for a particular application.

The aspects as described herein may use static camera data in accordance with any suitable type of color array, which may be provided via respective channel inputs of the suitable trained system. The use of the three colors C1, C2, and C3 as shown in FIG. 3 is by way of example and not limitation, and the aspects described herein may use any suitable type of static camera configured to operate in accordance with any suitable color array configuration and having any suitable number of color channels. Moreover, the aspects as described herein may implement any suitable type of color filter matrix, such as an RGGB filter matrix, RYYCy, RYYB, RYYY, RYYG, RYYC, CyYYM etc. Thus, the aspects described herein may implement, any suitable number of array colors. As additional examples, the static cameras may provide static camera data that includes image data generated outside the visible spectrum, such as the IR and UV spectral ranges, for instance.

As additional examples, aspects may include the use of monochrome sensors as static cameras to generate static camera image data. Such monochrome sensors may not include color filters and thus allow all incident light to reach the pixel sensors, which as a result provide significantly better low light performance than imagers having a color filter matrix. As an example, one filter matrix that achieves good low light performance and still retains some color information uses only red and clear color filter elements. This may include, for instance, a RCCC (red, clear, clear, clear) filter matrix, which has no G or B filter elements and has R filter elements covering only every second pixel sensor in every second row. The R filter elements allow a camera system using this filter to detect red traffic signals and break lights of other vehicles. The lack of G filters, however, makes it difficult for optical systems including an RCCC filter matrix to sense other colors, such as yellow traffic signs and/or yellow and green traffic signals.

Thus, the aspects as described herein may be adapted to other static camera image types by, for instance, modifying the channel input and training the trained system in accordance with the particular data that is expected to be processed in accordance with the static camera hardware used for a particular application. For example, the colors C1, C2, C3 may correspond to individual channel inputs associated with a camera operating in accordance with the aforementioned CYM color array, an RGB color array, non-visible light, monochromatic sensors operating without a color filter, etc.

In an aspect, the frame channels represent a combination of images associated with different sets of sensor data, i.e. sensor data acquired via different image acquisition devices 104 as discussed above. For example, the static camera frame channels includes a set of three frame channels for receiving the C1, C2, and C3 images. Again, these C1, C2, and C3 images represent images associated with each channel provided by a static camera sensor in accordance with a particular color filter arrangement (or lack thereof) of static camera-based sensor data acquired via one or more static cameras implemented via the image acquisition devices 104. Moreover, the C1, C2, and C3 images are provided to the input layer 302 via respective channels. Continuing this example, the event camera frame channels include another set of two frame channels for receiving Ep and En images, which are encoded with a number of positive events and a number of negative events, respectively. The number of positive and negative events are acquired using received event-based camera sensor data via one or more event cameras implemented via the image acquisition devices 104. The Ep and En images are also fed into the input layer 302 of the CNN architecture 300, as shown in FIG. 3. The data may be encoded into the Ep, En images provided via the event camera frame channels in various ways, as further discussed below.

Again, the CNN architecture 300 includes several layers 302, 304, 306, each performing a respective function in accordance with the CNN algorithm to provide the output bounding boxes and classes probability. In an aspect, the CNN architecture 300 includes the input layer 302 that is configured to receive the images C1, C2, C3, Ep, and En via each of the frame channels as shown in FIG. 3, multiple hidden layers 304, and the output layer 306. The hidden layers 304 may include one or more layers that are generally present for neural network functionality in accordance with CNN type architectures, such as one or more convolutional (Cony) layers, one or more rectified linear (ReLu) layers, one or more Crop pooling layers, etc.

The model or algorithm used by the CNN architecture 300 may include, for example, any suitable type of CNN-based algorithm configured to recognize and/or classify components of image data once trained as discussed herein. Thus, the CNN architecture 300 includes the hidden layers 304, which may function, once trained, as a trained neural network (e.g., a trained convolutional neural network in accordance with the example CNN architecture 300 as shown in FIG. 3) including the appropriate processing circuitry and neural network algorithms to perform the object location and classification functions in accordance with the various aspects as described herein. Thus, the CNN architecture 300 may function as a trained neural network that receives set of images C1, C2, C3, Ep, and En at the input layer 302 as separate channel inputs, and combines the data received via these channel inputs to determine a location and type of one or more objects included in a particular road scene.

For instance, the neural network forming the CNN architecture 300 may be trained using real-world examples of various objects of different sizes and/or shapes, under different lighting conditions, etc. As another example, the neural network may be trained and validated using a large number (e.g., 100,000, 150,000, or more) images generated from any suitable type of simulator (e.g., a Carla simulator) that may be configured for neural network training purposes. The architecture and functionality of CNNs are generally known, and thus additional details regarding the operation of the CNN architecture 300 are not further discussed herein. However, the specific manner in which the data represented by the frame channels is encoded at the input layer 302 enables the CNN architecture 300 to process image data from different camera sources, and is further discussed below with reference to FIGS. 4A-4C.

Figure 4A:
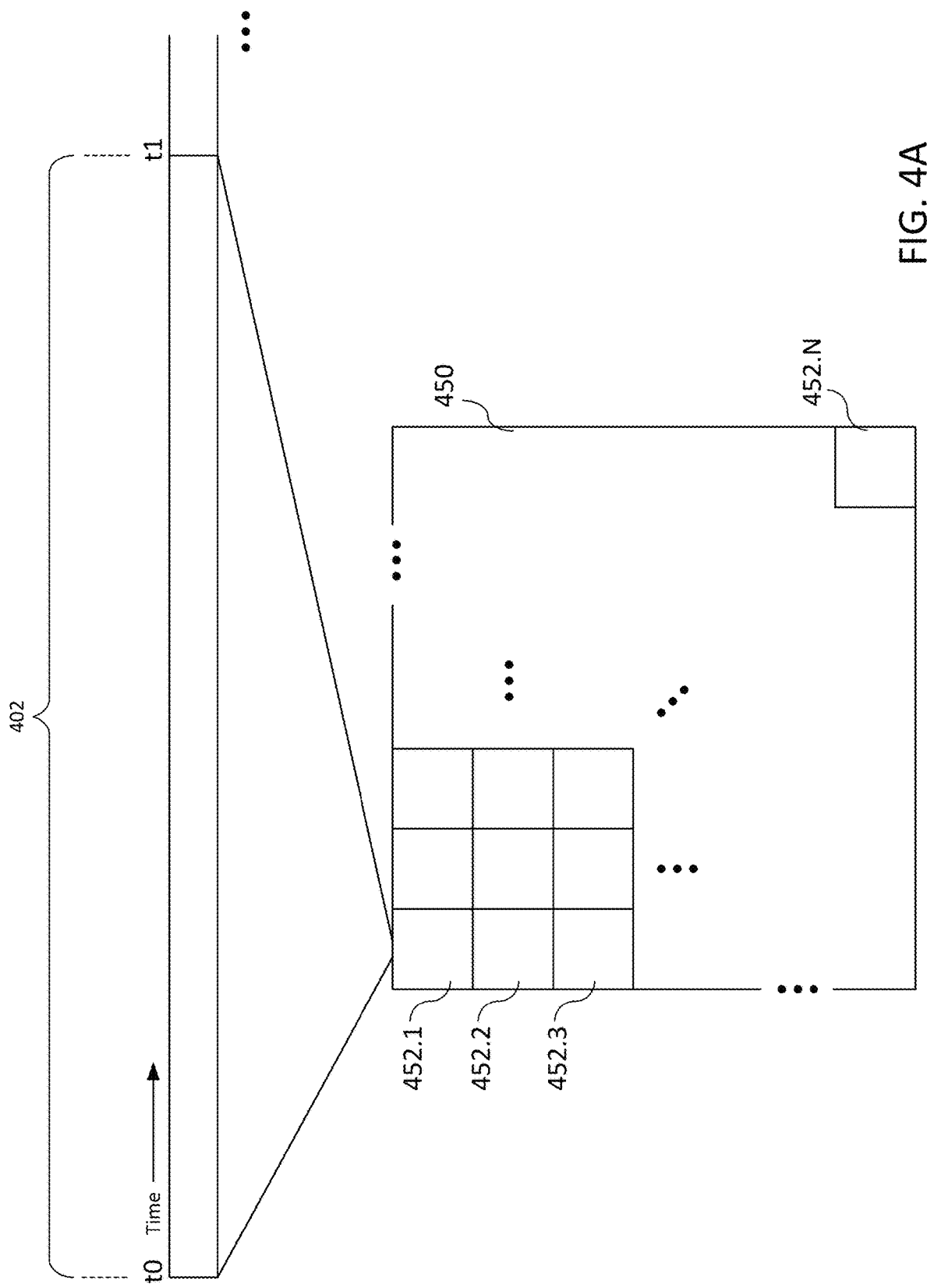
FIGS. 4A-4C illustrate exemplary encoding techniques to generate images for frame channels from event-based camera sensor data, in accordance with various aspects of the present disclosure.
Figure 4B:
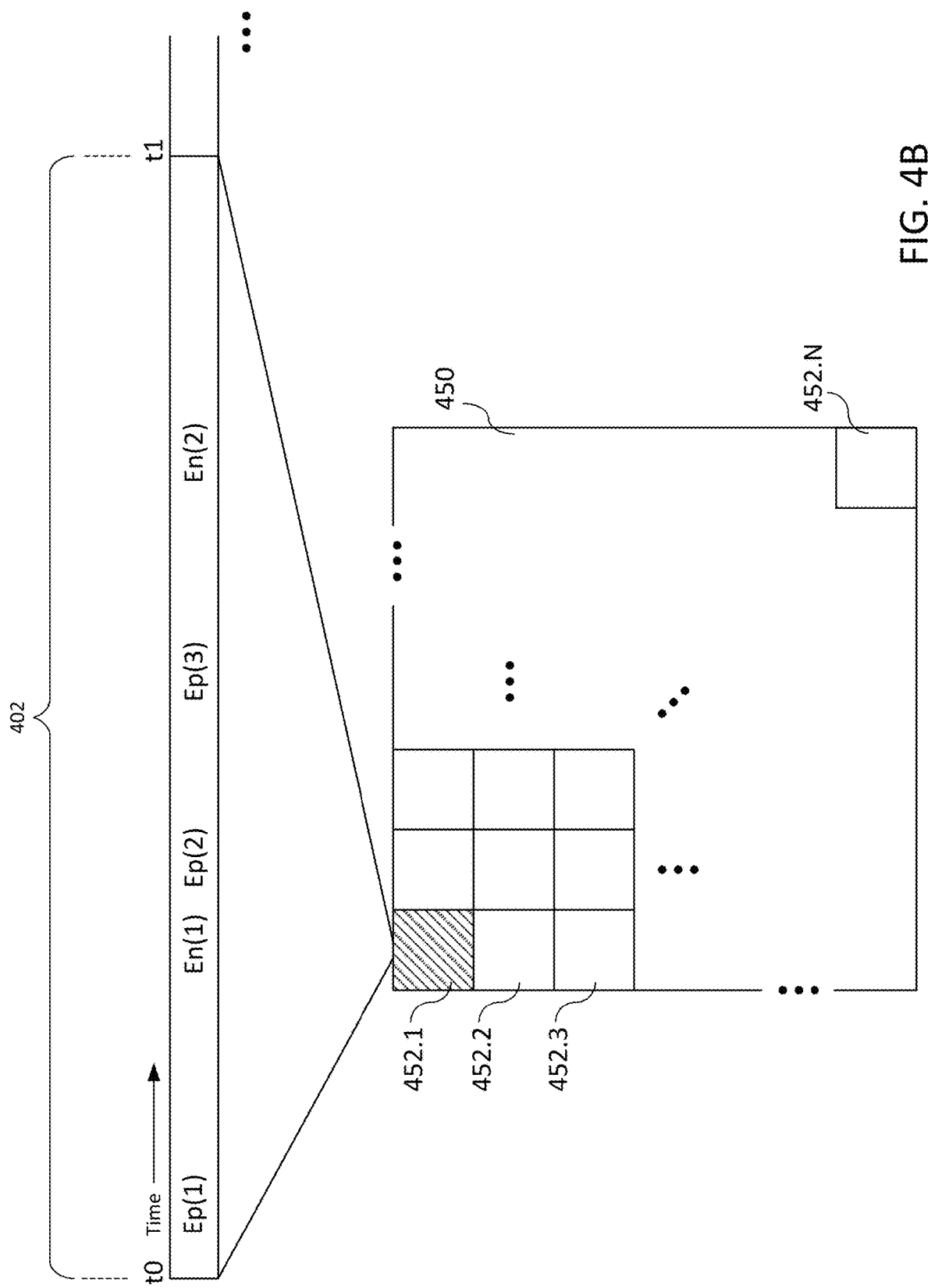
Figure 4C:
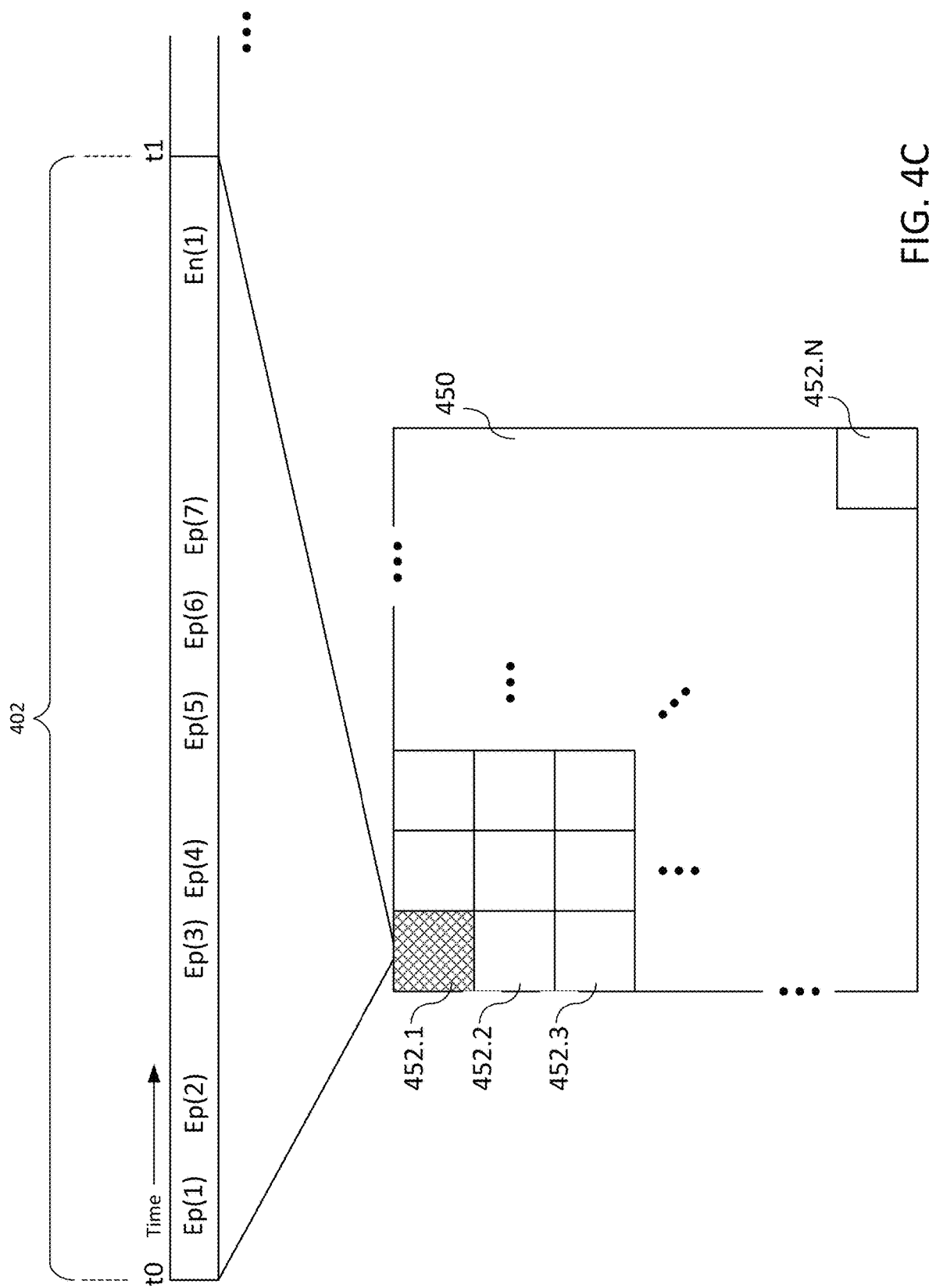

FIGS. 4A-4C illustrate exemplary encoding techniques to generate images for frame channels from event-based camera sensor data, in accordance with various aspects of the present disclosure. Each of FIGS. 4A, 4B, and 4C corresponds to a different example scenario with respect to different road scenes. Each of FIGS. 4A-4C shows an example image 450 that includes encoded data associated with received event-based camera sensor data. For purposes of brevity, the example image 450 may be identified with an image that is provided, at one instant in time, as an encoded image Ep via a respective frame channel to the input layer 302, as shown and discussed above with reference to FIG. 3. However, the same techniques as discussed with respect to the encoded image Ep may be applied to encode data (corresponding to the same instant in time as the image Ep) for the image En.

As shown in FIGS. 4A-4C, the image 450 may include any suitable number N of pixels 452.1-452.N, with each pixel 452 independently providing event-based camera sensor data (also referred to herein as "raw data") within a time window 402. In other words, the time window 402 spans from an initial time t0 to a time t1, which corresponds to a particular sampling period of time during which the event camera samples, via each pixel 452.1-452.N, raw data. Although a single time period (time window 402) is shown in FIGS. 4A-4C for purposes of brevity, it is understood that the event camera continues to sample raw data over any suitable number of successive sampling periods.

The length of time associated with each of these successive sampling periods may be equal to one another and based upon a predetermined or otherwise known time value. For example, the temporal length of the time window 402 (i.e., 040) may be based upon the frame rate of the static camera. For example, the temporal length of the time window 402 may be equal to or substantially equal to (e.g., within 1%, 5%, 10%, etc.) the time period between consecutive frames of data sampled by the static camera used to provide the set of image data channels C1, C2, and C3 as discussed above with respect to FIG. 3. In other words, because the event camera samples data at a faster rate than the frame rate of the static camera, the time window 402 may be used as a reference to time-align or synchronize the images provided by each of the event camera and the static camera over the frame channels. Thus, while events may be generated in a near-continuous manner by each pixel 452.1-452.N of the event camera, aspects include the neural network algorithm implemented via the CNN architecture 300 being executed periodically, at a constant frame rate that may be synchronized with or otherwise using (e.g. triggered by) the frame rate of the static camera.

In an aspect, the static camera-based sensor data generated by the static camera, which is used to provide the set of images C1, C2, and C3, may be sampled at the start and at the end of the time window 402, as the time periods t0 and t1 are considered to be substantially (e.g., within 0.1%, 0.5%, 1%, 5%, etc.) time-aligned with the frame rate of the static camera. Static cameras typically provide this data in respective channels as part of their ordinary operation, or otherwise these wavelengths may be filtered out or extracted from the composite image data acquired from the static camera. Moreover, although full frame synchronization is used to describe the aspects herein, this is for ease of explanation and by way of example and not limitation. The aspects described herein may use any suitable frame rate or sub-frame rates thereof to facilitate the time-alignment and synchronization of the static camera images and the event camera images. For instance, aspects implementing sub-frame synchronization may be particularly useful when the static capture camera is a rolling shutter camera in which scan lines are read in time series one after the other. In any event, encoding the static camera-based sensor data into the C1, C2, and C3 images may include separating the composite image data or, when available, providing each wavelength-separated C1, C2, and C3 (when a color filter is used) to the input layer 302 of the CNN architecture 302 at the start of each successive frame (e.g., at times t0 and t1) or sub-frame, as the case may be.

However, because of the difference in sampling rates between the event camera and the static camera, aspects include the raw data that is generated within the time window 402 being formatting into encoded images, which may then be used as the images Ep, En provided at the input layer 302 of the CNN architecture 300. This encoding may be performed in different ways, as further discussed below. To do so, regardless of the manner in which the raw data is encoded into the images Ep, En, it is noted that the event camera generates, during each sampling period (e.g. within the time window 402), raw data that is a collection of what is typically a large number of detected events (e.g., several hundred) and, for each detected event, the raw data also includes a time stamp, the pixel x, y coordinates, and the polarity of the event. With this in mind, we now turn to the manner in which the raw data is encoded into the images Ep, En.

In an aspect, the raw data is encoded by counting a number of positive events Ep and negative events En within the time window 402. Then, for each respective pixel 452.1-452.N, the number of counted Ep events (for the Ep image) and the number of counted En events (for the En image) are normalized to provide intensity gradient values based upon a predetermined range of values. This range of values may be any suitable range depending upon the desired granularity and accuracy of a particular application. For example, the intensity value range may be from 0 (no events or a minimum number of events occurring) to 255 (a maximum number of events occurring) in accordance with an 8-bit encoding system.

Turning now to the FIGS. 4A-4C, the example time window 402 in FIG. 4A includes no detected events, the time window in FIG. 4B includes five detected events (three positive and two negative), whereas the time window 402 in FIG. 4C includes eight detected events (seven positive and one negative). Again, the number of such events would typically be much greater, and the small number of events shown in the examples of FIGS. 4A-4C is for purposes of brevity and ease of explanation. Using the Ep frame channel as an example, the image 450 as shown in FIG. 4A would be encoded to assign to pixel 452.1 a minimum intensity gradient value, as no events (either positive or negative) have been detected. The image 450 as shown in FIG. 4B, however, is encoded to assign to pixel 452.1 an intensity gradient value that is based upon a normalization, in this example, of three positive events. Moreover, the image 450 as shown in FIG. 4C is encoded to assign to pixel 452.1 an intensity gradient value that is based upon a normalization, in this example, of seven positive events.

In other words, the raw data of each pixel of the event camera is formatted, or encoded, into images Ep provided as an input to the input layer 302 of the CNN architecture 300 via the Ep frame channel by aggregating a number of positive events for the positive event channel occurring within the time window to generate a positive event image. Thus, as shown by comparing the shading of the pixel 452.1 among each of the FIGS. 4A-4C, the intensity gradient value increases with the number of counted positive events sampled by the pixel 452.1 within the time window 402, resulting in the shading of the pixel 452.1 increasing from no shading in FIG. 4A to increasingly darker colors corresponding to larger grayscale values in FIGS. 4B and 4C.

Again, this process is repeated for each pixel 452.1-452.N within the image 450 in accordance with that particular pixel's number of counted events as indicated in the raw data for that pixel, and is likewise repeated for each image Ep, En with respect to the counted positive and negative events within the time window 402, respectively. This process is then repeated over time as additional road scenes are acquired by the event camera and the static camera such that the input layer 302 of the CNN architecture 302 receives, at each static camera frame when the C1, C2, and C3 images are provided, the set of images Ep, En, that contain encoded data indicating the number of positive and negative events, respectively, that were detected since the last static camera frame.

Thus, as described above, the images Ep, En are encoded based upon a counted number of positive and negative events occurring within the time window 402 associated with each pixel 452.1-452.N. However, in other aspects, an alternative approach is used in which the images Ep, En are encoded using a "time surface." In accordance with such aspects, instead of accumulating events on each of the pixels 452.1-452.N during the time window 402, as discussed above, each event is integrated immediately into the image corresponding to the respective frame channel. For example, aspects include applying a kernel having dimensions of m-by-m pixels, which is centered on the pixel coordinates of an Ep event to encode the Ep image, with m being any suitable integer (e.g., 2×2 pixels, 3×3 pixels, etc.). Likewise, these aspects include applying a kernel having dimensions of m-by-m pixels centered on the pixel coordinates of an En event to encode the En frame channel image.

In accordance with such aspects, the kernel masks out pixels which are not in the boundary of objects in the image, in a similar manner as spatial high pass filters or edge detectors in digital image processing, but also acts in the temporal dimension. Since aspects include the kernels being applied asynchronously, the kernels function to sharpen pixel regions where most recent activity has occurred and suppress regions which have not been active recently. In other words, the use of kernels function to assign a maximum weight to the most recent events and a decreasing weight to events which are both spatially and temporally removed from the former.

Aspects include providing, at the input layer 302 of the CNN architecture 302, encoded Ep, En images in accordance with the established CNN algorithm sampling rate (e.g. the static camera frame rate as discussed above), such that the state of the images at the expiration of the time window 402 are input via each respective frame channel as images Ep, En to the input layer 302.

Regardless of the manner in which the Ep, En images are encoded, the C1, C2, C3, En, and Ep images as shown in FIG. 3 may be considered as the input provided by each respective frame channel at one instant in time, with additional images being input to the input layer 302 of the CNN architecture 300 at each frame as additional static camera images are acquired via the static camera (e.g. at the frame rate of the static camera) and as additional raw data is acquired via the event cameras and encoded in accordance with the static camera frame rate. Thus, the CNN architecture 300 may function to periodically or continuously detect and determine the location and type of detected objects within a road scene based upon the combination of the static camera data and the event camera data. In this way, the CNN architecture 300 may facilitate the detection, location, and identification of objects within a road scene with high probability and accuracy in a wide-range of environmental and lighting conditions.

Thus, aspects include the convolutional neural network implemented via the CNN architecture 300 receiving the C1, C2, C3, Ep, and En images over the five respective frame channels at the input layer 302. The different C1, C2, C3, Ep, and En images are then integrated within a predetermined time window (e.g. time window 402). As discussed above, the Ep, En images may be encoded by counting the number of positive and negative events, respectively, occurring within each time window 402 for each pixel 452.1-452.N. However, in other aspects the Ep and En images may be encoded differently. For example, as an alternative to performing encoding based upon a number of counted positive and negative events, the convolutional neural network implemented via the CNN architecture 300 may instead calculate an average of positive and negative events within the time window 402 (e.g. (Ep+En)/N)), with N representing the number of changes that occurred in that particular pixel, as well as a variance of the events occurring within the time window 402. In other words, when the number of positive and negative events are averaged at a pixel in this manner, if no changes have occurred within the time window 402 then the average of the positive and negative events for that pixel will be zero.

Continuing this example, the average and the variance may be normalized to be within a range of intensity values (e.g., from 0 to 255), and these values may be encoded into each Ep, En image (e.g. assigned as pixel intensity values). As an example, the variance may be represented as a calculation of how many times a particular pixel varies over the time window 402. In other words, the variance calculation is indicative of how many events are received at each pixel, with a higher number of events for a particular pixel yielding a larger variance value. The Ep, En images may then be encoded at the end of the time window 402 by normalizing each pixel with a variance value between 0-255, for example. In this way, each of the Ep, En image for each respective channel may represent the average events and how much those events vary (variance) at each pixel location within each Ep, En image.

Regardless of the manner in which the Ep, En images are encoded, aspects include the convolutional neural network implemented via the CNN architecture 300 outputting, at the output layer 306, object detection data that indicates a number of bounding boxes. The object detection data may also indicate, for each one of these bounding boxes, the probability that the corresponding object is inside the respective bounding box, including the background. Thus, for each bounding box, the resultant probabilities are ordered. If the higher probability exceeds a threshold probability value, then that class is selected for that particular bounding box. Examples of specific road scene scenarios are further provided below with respect to FIGS. 5A-5C to demonstrate the robust nature of object detection in accordance with the aspects as described herein.

Figure 5A:
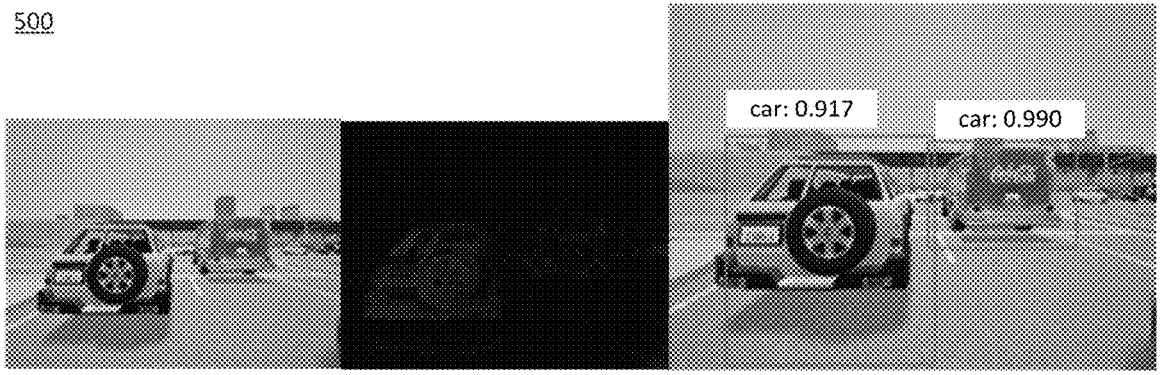
FIGS. 5A-5C illustrate example static image and event image inputs with corresponding object detection outputs, in accordance with various aspects of the present disclosure.
Figure 5B:
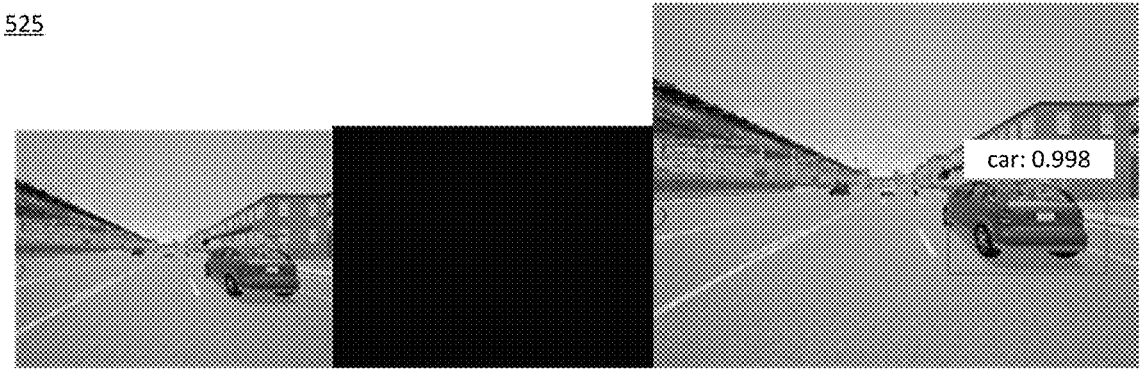
Figure 5C:
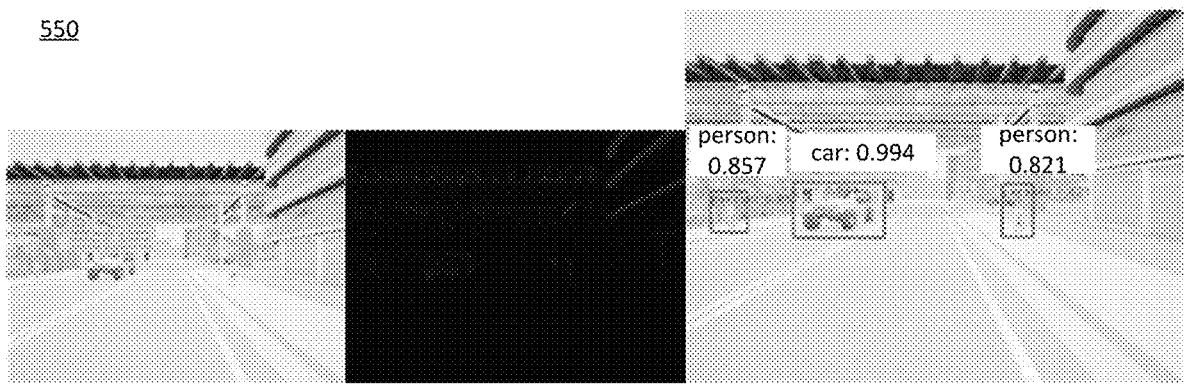

FIGS. 5A-5C illustrate example static image and event image inputs with corresponding object detection outputs, in accordance with various aspects of the present disclosure. In each of the example image sets shown in FIGS. 5A-5C, the left image represents a composite image associated with the static camera data, which may be encoded to provide the C1, C2, C3 images to the input layer 302 of the CNN architecture 300. The center image in each of the FIGS. 5A 5C corresponds to the event camera data, which may be encoded to provide the Ep, En images to the input layer 302 of the CNN architecture 300. The right image corresponds to the data generated at the output layer 306 of the CNN architecture 300, which provides a location (bounding box) associated with each detected object, as well as the identification (classification) of the type of object and an associated probability of that classification. For clarity, the text inside each of the output images in FIGS. 5A-5C has been reproduced outside each bounding box for better readability.

In the example image set 500 as shown in FIG. 5A, there is both good illumination and motion present in the road scene, and thus static camera images C1, C2, C3, as well as the event camera encoded images Ep, En, provide a full set of information regarding the current road scene via the input layer 302. The output data is shown with the location (bounding boxes) and classified type of the detected objects. However, in the example image set 525 of FIG. 5B, the road scene is static, and thus no events are available via the event camera data. As a result, the received event-based camera sensor data does not indicate positive events or negative events, and the encoded images Ep, En do not provide such information to the input layer 302. However, the trained neural network of the CNN architecture 300 may still determine the location and type of the one or more objects included in the static scene using the combined data received via the set of frame channels, as the static camera images would still provide data to serve this purpose, as shown in FIG. 5B. Finally, in the example image set 550 of FIG. 5C, bright illumination results in an overexposed image in which the C1, C2, and C3 images (R, G, and B in this example) do not reliably indicate the presence of an object, although the encoded Ep, En images from the event camera still do so.

Thus, the trained neural network of the CNN architecture 300 may still determine the location and type of the one or more objects included in the road scene using the combined data received via the set of frame channels, as the data provided via the event-based camera sensor data still serves this purpose.

Figure 6:
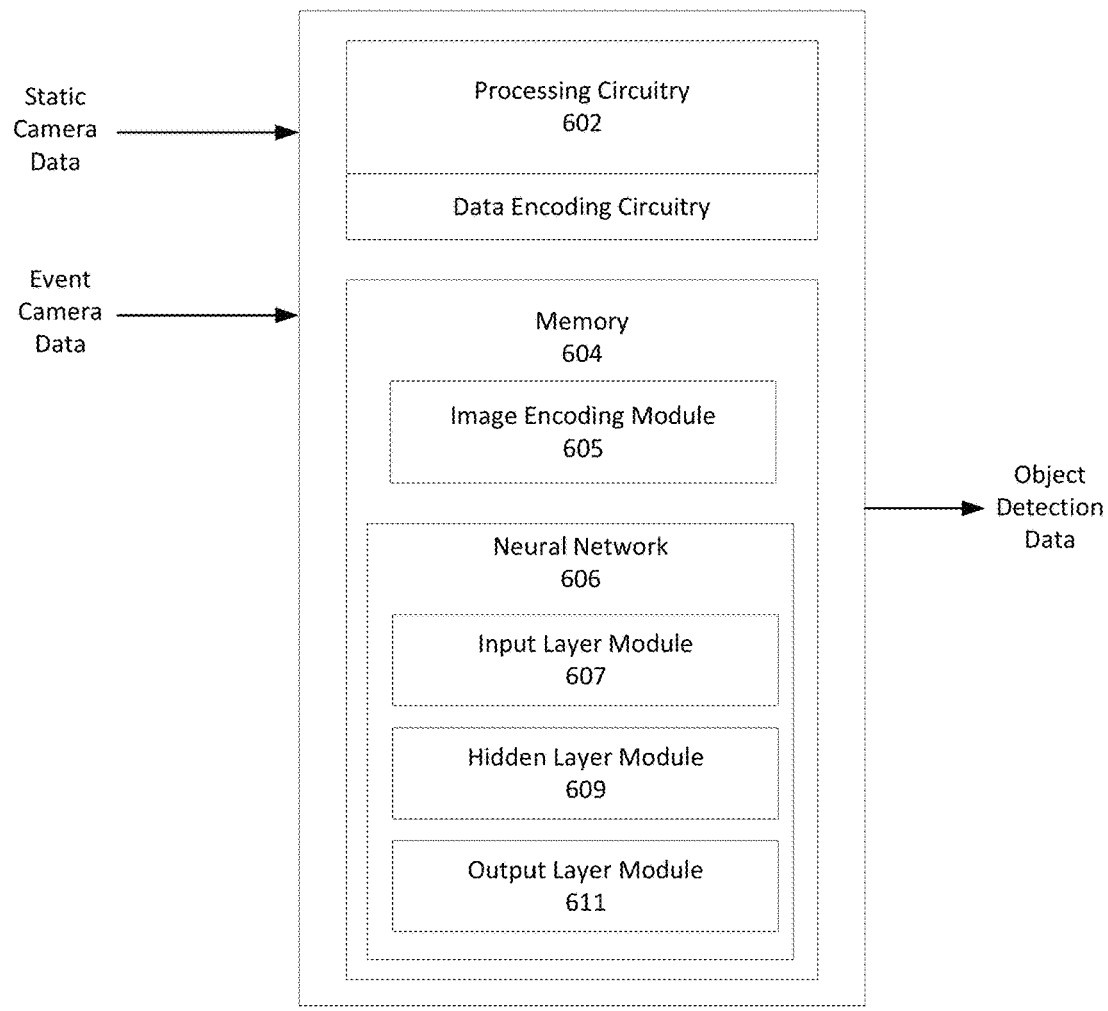
FIG. 6 illustrates an exemplary local processing unit, in accordance with various aspects of the present disclosure.

FIG. 6 illustrates an exemplary local processing unit, in accordance with various aspects of the present disclosure. The local processing unit 600 (also referred to herein as local processing circuitry or a local processing system) may utilize the static camera based sensor data acquired via one more static cameras and the event camera based sensor data acquired via one or more event cameras, as discussed herein. The static camera based sensor data and the event camera based sensor data may be encoded by the local processing unit 600 or another portion of the AV in which the local processing unit is implemented to provide the C1, C2, C3, Ep, and En images at the input layer 302 of the CNN architecture 300 as discussed herein, which may be used to detect the location and type of various objects within a road scene.

To do so, the local processing unit 600 may be implemented in different ways depending upon the particular application and/or implementation of the autonomous vehicle in which it is implemented. For instance, the local processing unit 600 may be identified with one or more portions of the safety system 200 as shown in FIG. 2. Continuing this example, the local processing unit 600 may include one or more of the one or more processors 102 and accompanying image processor 216, application processor 214, and communication processor 218, as well as the one or more memories 202. Continuing this example, the local processing unit 600 may be integrated as part of an autonomous vehicle in which it is implemented as one or more virtual machines running as a hypervisor with respect to one or more of the vehicle's existing systems, as a control system of an AV, an ECU of the AV, etc.

Thus, and as further discussed below, the local processing unit 600 may be implemented using these existing components of the safety system 200, and be realized via a software update that modifies the operation and/or function of one or more of these processing components. In other aspects, the local processing unit 600 may include or more hardware and/or software components that extend or supplement the operation of the safety system 200. This may include adding or altering one or more components of the safety system 200. In yet other aspects, the local processing unit 600 may be implemented as a stand-alone device, which is installed as an after-market modification to the autonomous vehicle in which it is implemented. Although not shown in FIG. 6 for purposes of brevity, the local processing unit 600 may additionally include one or more communication interfaces (or implement such interfaces that are part of the safety system 200). These communication interfaces may facilitate receiving the static camera based sensor data and the event camera based sensor data and, when encoded by a separate device, alternatively receiving the C1, C2, C3, Ep, and En images. These communication interfaces may additionally facilitate transmitting the object detection data to one or more components (e.g., electronic control units (ECUs) and/or control systems) of the AV in which the local processing unit 600 is implemented.

For example, the static camera based sensor data and the event camera based sensor data may be received from a media control unit (MCU) of the vehicle in which the local processing unit 600 is implemented. Alternatively, the MCU may encode the static camera based sensor data and the event camera based sensor data to provide the C1, C2, C3, Ep, and En images. The MCU may be a separate from, integrated with, form part of, or otherwise work in conjunction with the local processing unit 600. As an example, the MCU is not shown in the Figures for purposes of brevity, but may be a component of the vehicle in which the local processing unit 600 is implemented such as a special purpose ECU. As another example, the MCU may form part of the safety system 200 or another system of the vehicle in which the local processing unit 600 is implemented.

Regardless of the implementation of the local processing unit 600, aspects include the local processing unit 600 processing the received data (i.e. either the static camera based sensor data and the event camera based sensor data, or the C1, C2, C3, Ep, and En images) and generating object detection data that indicates a number of bounding boxes as shown in FIGS. 5A-5C, with each bounding box containing the probability that each object is inside the bounding box, as well as the selected class for each bounding box.

To do so, the local processing unit 600 may include processing circuitry 602 and a memory 604. The components shown in FIG. 6 are provided for ease of explanation, and aspects include the local processing unit 600 implementing additional, less, or alternative components as those shown in FIG. 6. The processing circuitry 602 and memory 604 may be identical to or operate in a substantially similar manner as the one or more processors 102 and one or more memories 202, respectively, as described above with reference to the safety system 200. Alternatively, the processing circuitry 602 and the memory 604 may be identified with separate components, as noted above.

In any event, the processing circuitry 602 may be configured as any suitable number and/or type of computer processors, which may function to control the local processing unit 600 as discussed herein. Processing circuitry 602 may be identified with one or more processors (or suitable portions thereof) implemented by the local processing unit 600. For example, the processing circuitry 602 may, for example, be identified with one or more processors such as a host processor, a digital signal processor, one or more microprocessors, graphics processors, microcontrollers, an application-specific integrated circuit (ASIC), part (or the entirety of) a field-programmable gate array (FPGA), etc. In any event, aspects include the processing circuitry 602 being configured to carry out instructions to perform arithmetical, logical, and/or input/output (I/O) operations, and/or to control the operation of one or more components of local processing unit 600 to perform various functions associated with the aspects as described herein.

For example, the processing circuitry 602 can include one or more microprocessor cores, memory registers, buffers, clocks, etc., and may generate electronic control signals associated with electronic components to control and/or modify the operation of one or more components of the local processing unit 600 as discussed herein. Moreover, aspects include processing circuitry 602 communicating with and/or controlling functions associated with the memory 604 and/or other components of the local processing unit 600 and/or the vehicle in which the local processing unit 600 is implemented. This may include, for example, encoding the static camera based sensor data and the event camera based sensor data as the C1, C2, C3, Ep, and En images, as discussed herein with respect to FIGS. 4A-4C. In this case, the processing circuitry 602 may include the data encoding circuitry as shown in FIG. 6 for this purpose, which may form part of the processing circuitry 602 or a separate processing circuitry that is, for example, dedicated for this purpose.

In an aspect, the memory 604 stores data and/or instructions such that, when the instructions are executed by the processing circuitry 602, the processing circuitry 602 performs various functions as described herein. The memory 604 can be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 604 can be non-removable, removable, or a combination of both. For example, the memory 604 may be implemented as a non-transitory computer readable medium storing one or more executable instructions such as, for example, logic, algorithms, code, etc.

As further discussed below, the instructions, logic, code, etc., stored in the memory 604 are represented by the various modules as shown in FIG. 6, which may enable the aspects disclosed herein to be functionally realized. Alternatively, if the aspects described herein are implemented via hardware, the modules shown in FIG. 6 associated with the memory 604 may include instructions and/or code to facilitate control and/or monitor the operation of such hardware components. In other words, the modules shown in FIG. 6 are provided for ease of explanation regarding the functional association between hardware and software components. Thus, aspects include the processing circuitry 602 executing the instructions stored in these respective modules in conjunction with one or more hardware components to perform the various functions associated with the aspects as further discussed herein.

In an aspect, the executable instructions stored in the image encoding module 605 may facilitate, in conjunction with the processing circuitry 602 and/or the data encoding circuitry, encoding the static camera based sensor data and the event camera based sensor data as the RC1, C2, C3, Ep, and En images, as discussed herein with respect to FIGS. 4A-4C. This may also include monitoring the frame rate and data acquisition of one or more static cameras, determining the appropriate time window as discussed above, and/or time-aligning the event camera based sensor data with frames of static camera data to ensure that the input layer 302 of the CNN architecture 300 is appropriately formatted for processing via the trained neural network.

In an aspect, the trained neural network may be implemented as a combination of the processing circuitry 602 and execution of instructions stored in the memory 604 by the processing circuitry 602. Thus, the neural network 606 may represent a neural network algorithm that utilizes the input layer 302, the hidden layer 304, and the output layer 306 as discussed above with respect to FIG. 3. For instance, the input layer module 607, the hidden layer module 609, and the output layer module 611 may represent the software components of the respective input layer 302, the hidden layer 304, and the output layer 306 of the CNN architecture 300 to realize the functionality of the trained neural network as discussed herein. Thus, the CNN architecture 300 may function as a combination of hardware and software, with the CNN architecture 300 representing the neural network layered structure, and the various modules of the neural network 606 representing the executable software for the CNN architecture 300.

Figure 7:
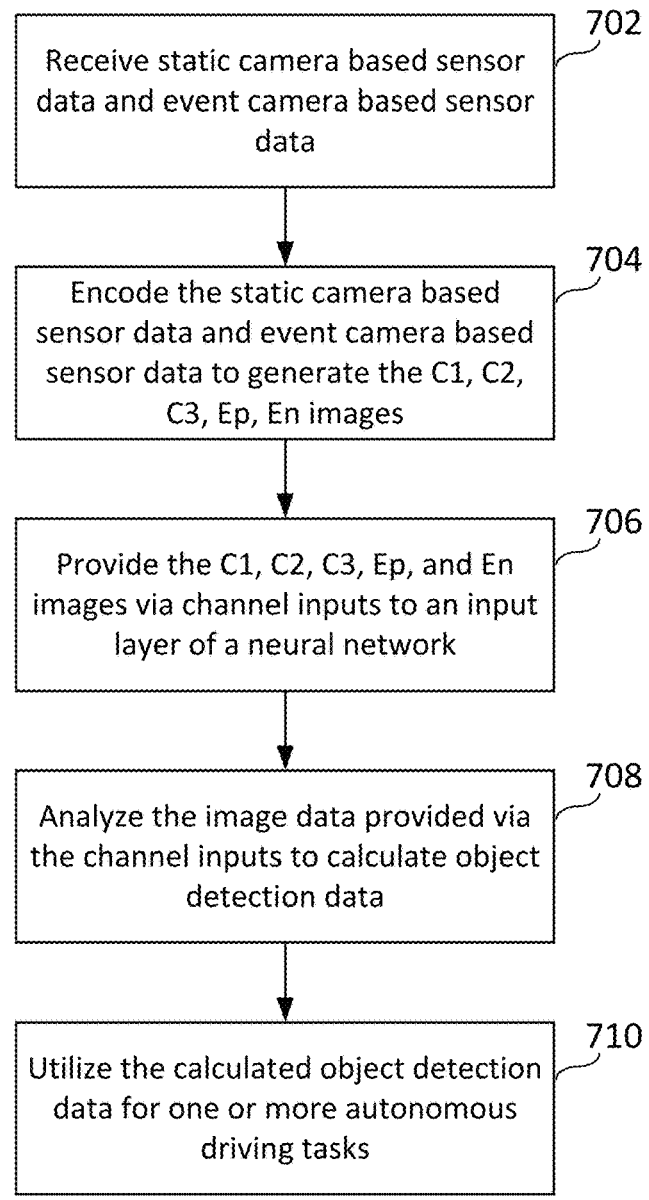
FIG. 7 illustrates an exemplary flow in accordance with various aspects of the present disclosure.

FIG. 7 illustrates an exemplary flow in accordance with various aspects of the present disclosure. With reference to FIG. 7, the flow 700 may be a computer-implemented method executed by and/or otherwise associated with one or more processors and/or storage devices. These processors and/or storage devices may be, for instance, one or more components of the CNN architecture 300, one or more components of the vehicle safety system 200, or any other suitable components of the local processing unit 600 or the vehicle in which the local processing unit 600 is implemented, as discussed herein. Moreover, in an embodiment, flow 700 may be performed via one or more processors executing instructions stored on a suitable storage medium (e.g., a non-transitory computer-readable storage medium) such as the processing circuitry 602 executing instructions stored in the memory 604, for instance. In an aspect, the flow 700 may describe an overall operation to receive and encode static camera based sensor data and the event camera based sensor data to generate the C1, C2, C3, Ep, and En images, and to generate the object detection data as discussed herein. Aspects may include alternate or additional steps that are not shown in FIG. 7 for purposes of brevity, and may be performed in a different order than the example steps shown in FIG. 7.

Flow 700 may begin when one or more processors receive (block 702) static camera based sensor data and the event camera based sensor data. This may include, for instance, the local processing unit receiving the static camera based sensor data and the event camera based sensor data generated by one or more cameras in accordance with a suitable color filter (or lack thereof) and one or more event cameras, over a suitable network or interface. For example, the static camera based sensor data and the event camera based sensor data may be received form their respective cameras via a local vehicle network or via one or more other suitable links, such as the links 220 as described above, for instance.

Flow 700 may include one or more processors encoding and/or otherwise obtaining (block 704) the static camera based sensor data and the event camera based sensor data being encoded into the C1, C2, C3, Ep, and En images that are provided via each of the frame channels, as discussed above with respect to FIGS. 4A-4C. Again, the encoding step here is optional, and may be performed when the received (block 702) static camera based sensor data and the event camera based sensor data is not already encoded as images.

Flow 700 may include one or more processors providing (block 706) the encoded C1, C2, C3, Ep, and En images, which are provided at the input layer of a neural network. This may include, for example, providing the C1, C2, C3, Ep, and En images via each frame channel to the input layer 302 of the CNN architecture 300, as discussed herein.

Flow 700 may include one or more processors analyzing and/or processing (block 708) the C1, C2, C3, Ep, and En images via the channel inputs to calculate object detection data. This may include, for instance, applying a suitably trained neural network algorithm to the combined image data. As an example, this may include processing frames of the static camera images including the static-based camera sensor data, and processing the encoded information included in the event camera images, each being received via the respective channel inputs, to determine a location and type of one or more objects included in the scene. Again, the training may be performed in accordance with similar types of road scenes in various conditions, such that the CNN may appropriately convolve, downsample, and combine the C1, C2, C3, Ep, and En images to detect the location of objects in the overall road scene as a bounding box together with the classified probability of the type of object in the road scene.

Flow 700 may include one or more processors utilizing (block 710) the generated object detection data for one or more autonomous driving and/or navigation tasks. This may include, for instance, using the location and type of each object via one or more ECUs and/or control systems of an AV as part of any suitable type of AV algorithm to steer the vehicle around objects, to apply the vehicle brakes, or to otherwise control one or more AV functions and to navigate the AV.

EXAMPLES

The following examples pertain to further aspects.

Example 1 is an object detection and classification system of an autonomous vehicle (AV), the object detection and classification system comprising: one or more processors; and a memory configured to store instructions that, when executed by the one or more processors, cause the one or more processors to: obtain a first set of images associated with a scene, the first set of images being encoded using static-based camera sensor data; obtain a second set of images associated with the scene, the second set of images including encoded information representing events occurring within a time window using event-based camera sensor data; receive the first set of images and the second set of images as separate respective channel inputs; process (i) frames of the first set of images including the static-based camera sensor data, and (ii) the encoded information included in the second set of images, received via the channel inputs, to determine a location and type of one or more objects included in the scene; and provide the location and type of the one or more objects included in the scene to a control system of the AV to perform one or more autonomous navigation tasks In Example 2, the subject matter of Example 1, wherein the encoded information included in the second set of images represent events occurring within the time window that is based upon consecutive frames of the received static-based camera sensor data.

In Example 3, the subject matter of any combination of Examples 1-2, wherein the first set of images includes a cyan wavelength image, a magenta wavelength image, and a yellow wavelength image, and wherein the second set of images includes a positive event image and a negative event image.

In Example 4, the subject matter of any combination of Examples 1-3, wherein the one or more processors are configured to: encode the received event-based camera sensor data into (i) the positive event image using a number of a positive events occurring within the time window, and (ii) the negative event image using a number of a negative events occurring within the time window.

In Example 5, the subject matter of any combination of Examples 1-4, wherein the one or more processors are configured to encode the received event-based camera sensor data into the positive event image and the negative event image by: assigning, to each pixel of the positive event image, an intensity gradient value that is based upon a number of aggregated positive events detected within the time window by each respective pixel of an event camera image as indicated by the event-based camera sensor data; and assigning, to each pixel of the negative event image, an intensity gradient value that is based upon a number of aggregated negative events detected within the time window by each respective pixel of an event camera image as indicated by the event-based camera sensor data.

In Example 6, the subject matter of any combination of Examples 1-5, wherein the scene is a static road scene that causes the received event-based camera sensor data to indicate no positive events and no negative events, and wherein the one or more processors are configured to determine the location and type of the one or more objects included in the static scene using the combination of the first set of images and the second set of images received via the channel inputs.

In Example 7, the subject matter of any combination of Examples 1-6, wherein the one or more processors are configured to encode the received event-based camera sensor data into the positive event image and the negative event image by: applying a kernel of m-by-m pixel dimensions centered on each respective pixel coordinate within the positive event image to encode the positive event image in accordance with a time surface encoding, with m being an integer value; and applying a kernel of m-by-m pixel dimensions centered on each respective pixel coordinate within the negative event image to encode the negative event image in accordance with a time surface encoding, with m being an integer value.

Example 8 is an autonomous vehicle (AV), comprising: a media control unit configured to obtain (i) obtain a first set of images associated with a scene, the first set of images being encoded using static-based camera sensor data, and (ii) a second set of images associated with the scene, the second set of images including encoded information representing events occurring within a time window using event-based camera sensor data; and an electronic control unit (ECU) configured to (i) receive the first set of images and the second set of images as separate respective channel inputs, (ii) process frames of the first set of images, received via the channel inputs, including the static-based camera sensor data, (iii) process the encoded information included in the second set of images, received via the channel inputs, (iii) determine a location and type of one or more objects included in the scene, and (iv) provide the location and type of the one or more objects included in the scene to a control system of the AV to perform one or more autonomous navigation tasks.

In Example 9, the subject matter of Example 8, wherein the encoded information included in the second set of images represent events occurring within the time window based upon consecutive frames of the received static-based camera sensor data.

In Example 10, the subject matter of any combination of Examples 8-9, wherein the first set of images includes a cyan wavelength image, a magenta wavelength image, and a yellow wavelength image, and wherein the second set of images includes a positive event image and a negative event image.

In Example 11, the subject matter of any combination of Examples 8-10, wherein the media control unit is configured to encode the received event-based camera sensor data into (i) the positive event image using a number of a positive events occurring within the time window, and (ii) the negative event image using a number of a negative events occurring within the time window.

In Example 12, the subject matter of any combination of Examples 8-11, wherein the media control unit is configured to encode the received event-based camera sensor data into the positive event image and the negative event image by: assigning, to each pixel of the positive event image, an intensity gradient value based upon a number of aggregated positive events detected within the time window by each respective pixel of an event camera image as indicated by the event-based camera sensor data; and assigning, to each pixel of the negative event image, an intensity gradient value based upon a number of aggregated negative events detected within the time window by each respective pixel of an event camera image as indicated by the event-based camera sensor data.

In Example 13, the subject matter of any combination of Examples 8-12, wherein the scene is a static road scene that causes the received event-based camera sensor data to indicate no positive events and no negative events, and wherein the ECU is configured to determine the location and type of the one or more objects included in the static scene using the combination of the first set of images and the second set of images received via the channel inputs.

In Example 14, the subject matter of any combination of Examples 8-13, wherein the media control unit is configured to encode the received event-based camera sensor data into the positive event image and the negative event image by: applying a kernel of m-by-m pixel dimensions centered on each respective pixel coordinate within the positive event image to encode the positive event image in accordance with a time surface encoding, with m being an integer value; and applying a kernel of m-by-m pixel dimensions centered on each respective pixel coordinate within the negative event image to encode the negative event image in accordance with a time surface encoding, with m being an integer value.

Example 15 is a non-transitory computer-readable medium having instructions stored thereon that, when executed by one or more processors of a control system associated with an autonomous vehicle (AV), cause the AV to: obtain a first set of images associated with a scene, the first set of images being encoded using static-based camera sensor data; obtain a second set of images associated with the scene, the second set of images including encoded information representing events occurring within a time window using event-based camera sensor data; receive the first set of images and the second set of images as separate respective channel inputs; process (i) frames of the first set of images including the static-based camera sensor data, and (ii) the encoded information included in the second set of images, received via the channel inputs, to determine a location and type of one or more objects included in the scene; and provide the location and type of the one or more objects included in the scene to a control system of the AV to perform one or more autonomous navigation tasks.

In Example 16, the subject matter of Example 15, wherein encoded information included in the second set of images represent events occurring within the time window based upon consecutive frames of the received static-based camera sensor data.

In Example 17, the subject matter of any combination of Examples 15-16, wherein the first set of images includes a cyan wavelength image, a magenta wavelength image, and a yellow wavelength image, and wherein the second set of images includes a positive event image and a negative event image.

In Example 18, the subject matter of any combination of Examples 15-17, wherein the instructions, when executed by the one or more processors of the control system associated with the AV, cause the AV to encode the received event-based camera sensor data into (i) the positive event image using a number of a positive events occurring within the time window, and (ii) the negative event image using a number of a negative events occurring within the time window.

In Example 19, the subject matter of any combination of Examples 15-18, wherein the instructions, when executed by the one or more processors of the control system associated with the AV, cause the AV to encode the received event-based camera sensor data into the positive event image and the negative event image by: assigning, to each pixel of the positive event image, an intensity gradient value based upon a number of aggregated positive events detected within the time window by each respective pixel of an event camera image as indicated by the event-based camera sensor data; and assigning, to each pixel of the negative event image, an intensity gradient value based upon a number of aggregated negative events detected within the time window by each respective pixel of an event camera image as indicated by the event-based camera sensor data.

In Example 20, the subject matter of any combination of Examples 15-19, wherein the scene is a static road scene that causes the received event-based camera sensor data to indicate no positive events and no negative events, and wherein the instructions, when executed by the one or more processors of the control system associated with the AV, cause the AV to determine the location and type of the one or more objects included in the static scene using the combination of the first set of images and the second set of images received via the channel inputs.

In Example 21, the subject matter of any combination of Examples 15-20, wherein the instructions, when executed by the one or more processors of the control system associated with the AV, cause the AV to encode the received event-based camera sensor data into the positive event image and the negative event image by: applying a kernel of m-by-m pixel dimensions centered on each respective pixel coordinate within the positive event image to encode the positive event image in accordance with a time surface encoding, with m being an integer value; and applying a kernel of m-by-m pixel dimensions centered on each respective pixel coordinate within the negative event image to encode the negative event image in accordance with a time surface encoding, with m being an integer value.

Example 22 is an object detection and classification means for an autonomous vehicle (AV), comprising: one or more processing means; and a memory means for storing instructions that, when executed by the one or processing means, cause the one or more processing means to: obtain a first set of images associated with a scene, the first set of images being encoded using static-based camera sensor data; obtain a second set of images associated with the scene, the second set of images including encoded information representing events occurring within a time window using event-based camera sensor data; receive the first set of images and the second set of images as separate respective channel inputs; process (i) frames of the first set of images including the static-based camera sensor data, and (ii) the encoded information included in the second set of images, received via the channel inputs, to determine a location and type of one or more objects included in the scene; and provide the location and type of the one or more objects included in the scene to a control system of the AV to perform one or more autonomous navigation tasks In Example 23, the subject matter of Example 22, wherein the encoded information included in the second set of images represent events occurring within the time window that is based upon consecutive frames of the received static-based camera sensor data.

In Example 24, the subject matter of any combination of Examples 22-23, wherein the first set of images includes a cyan wavelength image, a magenta wavelength image, and a yellow wavelength image, and wherein the second set of images includes a positive event image and a negative event image.

In Example 25, the subject matter of any combination of Examples 22-24, wherein the one or more processing means: encode the received event-based camera sensor data into (i) the positive event image using a number of a positive events occurring within the time window, and (ii) the negative event image using a number of a negative events occurring within the time window.

In Example 26, the subject matter of any combination of Examples 22-25, wherein the one or more processing means encode the received event-based camera sensor data into the positive event image and the negative event image by: assigning, to each pixel of the positive event image, an intensity gradient value that is based upon a number of aggregated positive events detected within the time window by each respective pixel of an event camera image as indicated by the event-based camera sensor data; and assigning, to each pixel of the negative event image, an intensity gradient value that is based upon a number of aggregated negative events detected within the time window by each respective pixel of an event camera image as indicated by the event-based camera sensor data.

In Example 27, the subject matter of any combination of Examples 22-26, wherein the scene is a static road scene that causes the received event-based camera sensor data to indicate no positive events and no negative events, and wherein the one or more processing means determine the location and type of the one or more objects included in the static scene using the combination of the first set of images and the second set of images received via the channel inputs.

In Example 28, the subject matter of any combination of Examples 22-27, wherein the one or more processing means encode the received event-based camera sensor data into the positive event image and the negative event image by: applying a kernel of m-by-m pixel dimensions centered on each respective pixel coordinate within the positive event image to encode the positive event image in accordance with a time surface encoding, with m being an integer value; and applying a kernel of m-by-m pixel dimensions centered on each respective pixel coordinate within the negative event image to encode the negative event image in accordance with a time surface encoding, with m being an integer value.

Example 29 is an autonomous vehicle (AV), comprising: a media control means for obtaining (i) a first set of images associated with a scene, the first set of images being encoded using static-based camera sensor data, and (ii) a second set of images associated with the scene, the second set of images including encoded information representing events occurring within a time window using event-based camera sensor data; and an electronic control unit (ECU) means for (i) receiving the first set of images and the second set of images as separate respective channel inputs, (ii) processing frames of the first set of images, received via the channel inputs, including the static-based camera sensor data, (iii) processing the encoded information included in the second set of images, received via the channel inputs, (iv) determining a location and type of one or more objects included in the scene, and (v) providing the location and type of the one or more objects included in the scene to a control means of the AV to perform one or more autonomous navigation tasks.

In Example 30, the subject matter of Example 29, wherein the encoded information included in the second set of images represent events occurring within the time window based upon consecutive frames of the received static-based camera sensor data.

In Example 31, the subject matter of any combination of Examples 29-30, wherein the first set of images includes a cyan wavelength image, a magenta wavelength image, and a yellow wavelength image, and wherein the second set of images includes a positive event image and a negative event image.

In Example 32, the subject matter of any combination of Examples 29-31, wherein the media control means encodes the received event-based camera sensor data into (i) the positive event image using a number of a positive events occurring within the time window, and (ii) the negative event image using a number of a negative events occurring within the time window.

In Example 33, the subject matter of any combination of Examples 29-32, wherein the media control means encodes the received event-based camera sensor data into the positive event image and the negative event image by: assigning, to each pixel of the positive event image, an intensity gradient value based upon a number of aggregated positive events detected within the time window by each respective pixel of an event camera image as indicated by the event-based camera sensor data; and assigning, to each pixel of the negative event image, an intensity gradient value based upon a number of aggregated negative events detected within the time window by each respective pixel of an event camera image as indicated by the event-based camera sensor data.

In Example 34, the subject matter of any combination of Examples 29-33, wherein the scene is a static road scene that causes the received event-based camera sensor data to indicate no positive events and no negative events, and wherein the ECU means determines the location and type of the one or more objects included in the static scene using the combination of the first set of images and the second set of images received via the channel inputs.

In Example 35, the subject matter of any combination of Examples 29-34, wherein the media control means encodes the received event-based camera sensor data into the positive event image and the negative event image by: applying a kernel of m-by-m pixel dimensions centered on each respective pixel coordinate within the positive event image to encode the positive event image in accordance with a time surface encoding, with m being an integer value; and applying a kernel of m-by-m pixel dimensions centered on each respective pixel coordinate within the negative event image to encode the negative event image in accordance with a time surface encoding, with m being an integer value.

Example 36 is a non-transitory computer-readable means having instructions stored thereon that, when executed by one or more processing means of a control means associated with an autonomous vehicle (AV), cause the AV to: obtain a first set of images associated with a scene, the first set of images being encoded using static-based camera sensor data; obtain a second set of images associated with the scene, the second set of images including encoded information representing events occurring within a time window using event-based camera sensor data; receive the first set of images and the second set of images as separate respective channel inputs; process (i) frames of the first set of images including the static-based camera sensor data, and (ii) the encoded information included in the second set of images, received via the channel inputs, to determine a location and type of one or more objects included in the scene; and provide the location and type of the one or more objects included in the scene to a control system of the AV to perform one or more autonomous navigation tasks.

In Example 37, the subject matter of Example 36, wherein encoded information included in the second set of images represent events occurring within the time window based upon consecutive frames of the received static-based camera sensor data.

In Example 38, the subject matter of any combination of Examples 36-37, wherein the first set of images includes a cyan wavelength image, a magenta wavelength image, and a yellow wavelength image, and wherein the second set of images includes a positive event image and a negative event image.

In Example 39, the subject matter of any combination of Examples 36-38, wherein the instructions, when executed by the one or more processing means of the control means associated with the AV, cause the AV to encode the received event-based camera sensor data into (i) the positive event image using a number of a positive events occurring within the time window, and (ii) the negative event image using a number of a negative events occurring within the time window.

In Example 40, the subject matter of any combination of Examples 36-39, wherein the instructions, when executed by the one or more processing means of the control means associated with the AV, cause the AV to encode the received event-based camera sensor data into the positive event image and the negative event image by: assigning, to each pixel of the positive event image, an intensity gradient value based upon a number of aggregated positive events detected within the time window by each respective pixel of an event camera image as indicated by the event-based camera sensor data; and assigning, to each pixel of the negative event image, an intensity gradient value based upon a number of aggregated negative events detected within the time window by each respective pixel of an event camera image as indicated by the event-based camera sensor data.

In Example 41, the subject matter of any combination of Examples 36-40, wherein the scene is a static road scene that causes the received event-based camera sensor data to indicate no positive events and no negative events, and wherein the instructions, when executed by the one or more processing means of the control means associated with the AV, cause the AV to determine the location and type of the one or more objects included in the static scene using the combination of the first set of images and the second set of images received via the channel inputs.

In Example 42, the subject matter of any combination of Examples 36-41, wherein the instructions, when executed by the one or more processing means of the control means associated with the AV, cause the AV to encode the received event-based camera sensor data into the positive event image and the negative event image by: applying a kernel of m-by-m pixel dimensions centered on each respective pixel coordinate within the positive event image to encode the positive event image in accordance with a time surface encoding, with m being an integer value; and applying a kernel of m-by-m pixel dimensions centered on each respective pixel coordinate within the negative event image to encode the negative event image in accordance with a time surface encoding, with m being an integer value.

An apparatus as shown and described.

A method as shown and described.

Conclusion

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is driven on the ground, e.g., on a street, on a road, on a track, on one or more rails, off-road, etc.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

What is claimed is:

1. An object detection and classification system of an autonomous vehicle (AV), the object detection and classification system comprising:
   one or more processors; and
   a memory configured to store instructions that, when executed by the one or more processors, cause the one or more processors to:
     obtain a first set of images associated with a scene, the first set of images being encoded using static-based camera sensor data, each respective one of the first set of images being identified with a frame from among a plurality of frames;
     for each respective frame from among the plurality of frames, obtain a second set of images associated with the scene, the second set of images including encoded information representing events occurring within each respective frame using event-based camera sensor data;
     receive the first set of images and the second set of images via separate respective channel inputs, each one of the separate respective channel inputs being a dedicated channel input configured to provide, to a same input layer of a neural network, a different image from among the first set of images and the second set of images;
     process (i) the first set of images including the static-based camera sensor data, and (ii) the encoded information included in the second set of images to determine a location and type of one or more objects included in the scene; and
     provide the location and type of the one or more objects included in the scene to a control system of the AV to perform one or more autonomous navigation tasks.

2. The object detection and classification system of claim 1, wherein the different images from among the first set of images include a cyan wavelength image, a magenta wavelength image, and a yellow wavelength image, and
   wherein the different images from among the second set of images include a positive event image and a negative event image.

3. The object detection and classification system of claim 2, wherein the one or more processors are configured to, for each respective frame from among the plurality of frames:
   encode the received event-based camera sensor data into (i) the positive event image using a number of a positive events occurring within each respective frame, and (ii) the negative event image using a number of a negative events occurring within each respective frame.

4. The object detection and classification system of claim 2, wherein the one or more processors are configured to, for each respective frame from among the plurality of frames, encode the received event-based camera sensor data into the positive event image and the negative event image by:
   assigning, to each pixel of the positive event image, an intensity gradient value that is based upon a number of aggregated positive events detected within each respective frame by each respective pixel of an event camera image as indicated by the event-based camera sensor data; and
   assigning, to each pixel of the negative event image, an intensity gradient value that is based upon a number of aggregated negative events detected within each respective frame by each respective pixel of an event camera image as indicated by the event-based camera sensor data.

5. The object detection and classification system of claim 1,
   wherein the one or more processors are configured to use a combination of the first set of images and the second set of images received via the channel inputs to determine the location and type of the one or more objects included in the scene when the scene is a static road scene that causes the received event-based camera sensor data to indicate no positive events and no negative events.

6. The object detection and classification system of claim 1, wherein the one or more processors are configured to, for each respective frame from among the plurality of frames, encode the received event-based camera sensor data into the positive event image and the negative event image by:
   applying a kernel of m-by-m pixel dimensions centered on each respective pixel coordinate within the positive event image to encode the positive event image in accordance with a time surface encoding, with m being an integer value; and
   applying a kernel of m-by-m pixel dimensions centered on each respective pixel coordinate within the negative event image to encode the negative event image in accordance with a time surface encoding, with m being an integer value.

7. An autonomous vehicle (AV), comprising:
   a media control unit configured to (i) obtain a first set of images associated with a scene, the first set of images being encoded using static-based camera sensor data, each respective one of the first set of images being identified with a frame from among a plurality of frames, and (ii) for each respective frame from among the plurality of frames, obtain a second set of images associated with the scene, the second set of images including encoded information representing events occurring within each respective frame using event-based camera sensor data; and
   an electronic control unit (ECU) configured to (i) receive the first set of images and the second set of images via separate respective channel inputs, each one of the separate respective channel inputs being a dedicated channel input configured to provide, to a same input layer of a neural network, a different image from among the first set of images and the second set of images, (ii) process the first set of images including the static-based camera sensor data, (iii) process the second set of images including the encoded information included in the second set of images, (iv) determine a location and type of one or more objects included in the scene, and (v) provide the location and type of the one or more objects included in the scene to a control system of the AV to perform one or more autonomous navigation tasks.

8. The AV of claim 7, wherein the different images from among the first set of images include a cyan wavelength image, a magenta wavelength image, and a yellow wavelength image, and
wherein the different images from among the second set of images include a positive event image and a negative event image.

9. The AV of claim 8, wherein the media control unit is configured to, for each respective frame from among the plurality of frames, encode the received event-based camera sensor data into (i) the positive event image using a number of a positive events occurring within each respective frame, and (ii) the negative event image using a number of a negative events occurring within each respective frame.

10. The AV of claim 9, wherein the media control unit is configured to, for each respective frame from among the plurality of frames, encode the received event-based camera sensor data into the positive event image and the negative event image by:
assigning, to each pixel of the positive event image, an intensity gradient value based upon a number of aggregated positive events detected within each respective frame by each respective pixel of an event camera image as indicated by the event-based camera sensor data; and
assigning, to each pixel of the negative event image, an intensity gradient value based upon a number of aggregated negative events detected within each respective frame by each respective pixel of an event camera image as indicated by the event-based camera sensor data.

11. The AV of claim 7,
wherein the ECU is configured to use a combination of the first set of images and the second set of images received via the channel inputs to determine the location and type of the one or more objects included in the scene when the scene is a static road scene that causes the received event-based camera sensor data to indicate no positive events and no negative events.

12. The AV of claim 9, wherein the media control unit is configured to, for each respective frame from among the plurality of frames, encode the received event-based camera sensor data into the positive event image and the negative event image by:
applying a kernel of m-by-m pixel dimensions centered on each respective pixel coordinate within the positive event image to encode the positive event image in accordance with a time surface encoding, with m being an integer value; and
applying a kernel of m-by-m pixel dimensions centered on each respective pixel coordinate within the negative event image to encode the negative event image in accordance with a time surface encoding, with m being an integer value.

13. A non-transitory computer-readable medium having instructions stored thereon that, when executed by one or more processors of a control system associated with an autonomous vehicle (AV), cause the AV to:
obtain a first set of images associated with a scene, the first set of images being encoded using static-based camera sensor data, each respective one of the first set of images being identified with a frame from among a plurality of frames;
for each respective frame from among the plurality of frames, obtain a second set of images associated with the scene, the second set of images including encoded information representing events occurring within each respective frame using event-based camera sensor data;
receive the first set of images and the second set of images via separate respective channel inputs, each one of the separate respective channel inputs being a dedicated channel input configured to provide, to a same input layer of a neural network, a different image from among the first set of images and the second set of images;
process (i) the first set of images including the static-based camera sensor data, and (ii) the second set of images including the encoded information, to determine a location and type of one or more objects included in the scene; and
provide the location and type of the one or more objects included in the scene to a control system of the AV to perform one or more autonomous navigation tasks.

14. The non-transitory computer-readable medium of claim 13, wherein the different images from among the first set of images include a cyan wavelength image, a magenta wavelength image, and a yellow wavelength image, and
wherein the different images from among the second set of images include a positive event image and a negative event image.

15. The non-transitory computer-readable medium of claim 14, wherein the instructions, when executed by the one or more processors of the control system associated with the AV, cause the AV to, for each respective frame from among the plurality of frames, encode the received event-based camera sensor data into (i) the positive event image using a number of a positive events occurring within each respective frame, and (ii) the negative event image using a number of a negative events occurring within each respective frame.

16. The non-transitory computer-readable medium of claim 15, wherein the instructions, when executed by the one or more processors of the control system associated with the AV, cause the AV to, for each respective frame from among the plurality of frames, encode the received event-based camera sensor data into the positive event image and the negative event image by:
assigning, to each pixel of the positive event image, an intensity gradient value based upon a number of aggregated positive events detected within each respective frame by each respective pixel of an event camera image as indicated by the event-based camera sensor data; and
assigning, to each pixel of the negative event image, an intensity gradient value based upon a number of aggregated negative events detected within each respective frame by each respective pixel of an event camera image as indicated by the event-based camera sensor data.

17. The non-transitory computer-readable medium of claim 13,
wherein the instructions, when executed by the one or more processors of the control system associated with the AV, cause the AV to use a combination of the first set of images and the second set of images received via the channel inputs to determine the location and type of the one or more objects included in the scene when the scene is a static road scene that causes the received event-based camera sensor data to indicate no positive events and no negative events.

18. The non-transitory computer-readable medium of claim 13, wherein the instructions, when executed by the one or more processors of the control system associated with the AV, cause the AV to, for each respective frame from among the plurality of frames, encode the received event-based camera sensor data into the positive event image and the negative event image by:
   applying a kernel of m-by-m pixel dimensions centered on each respective pixel coordinate within the positive event image to encode the positive event image in accordance with a time surface encoding, with m being an integer value; and
   applying a kernel of m-by-m pixel dimensions centered on each respective pixel coordinate within the negative event image to encode the negative event image in accordance with a time surface encoding, with m being an integer value.

19. The object detection and classification system of claim 1, wherein the first set of images are encoded using the static-based camera sensor data, which is generated via a static-based camera independently of the event-based camera sensor data, and
   wherein the second set of images are encoded using the event-based camera sensor data, which is generated via an event-based camera independently of the static-based camera sensor data.

20. The object detection and classification system of claim 19, wherein the second set of images include multiple event camera images per each respective one of the plurality of frames that identify multiple events over each respective frame.

21. The object detection and classification system of claim 1, wherein the one or more processors are configured to use a combination of the first set of images and the second set of images received via the channel inputs to determine the location and type of the one or more objects included in the scene when the first set of images do not indicate a presence of the one or more objects in the scene.

* * * * *